Oct. 25, 1955 A. W. ANDERBERG 2,721,354
CABLE ATTACHING STRUCTURE AND METHOD OF MAKING SAME
Filed May 7, 1951
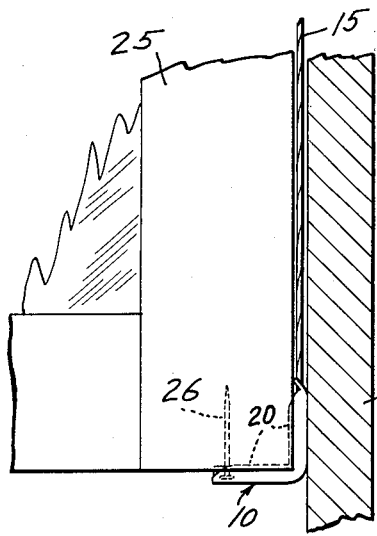
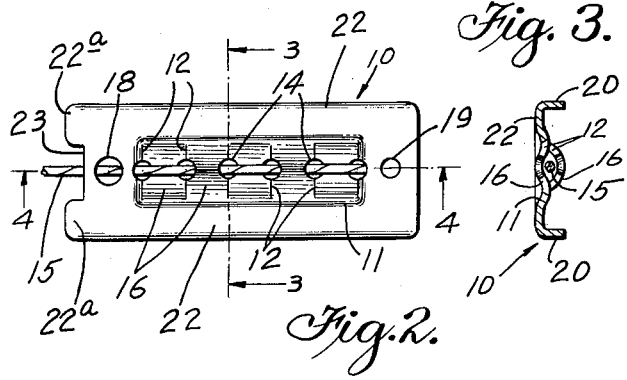
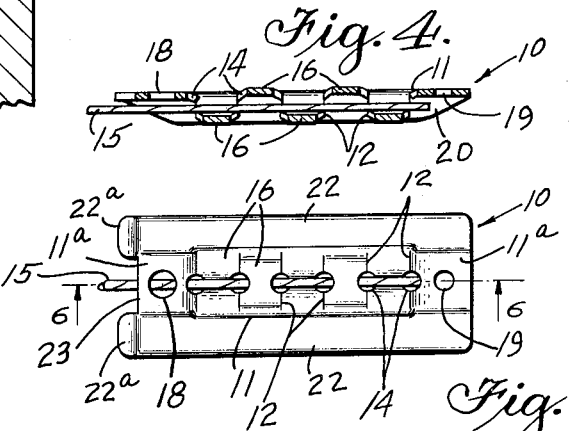
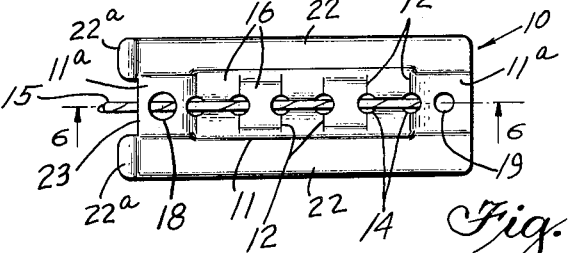
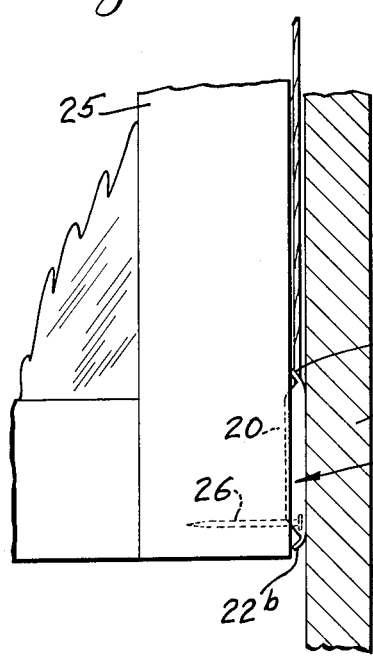
INVENTOR.
Axel W. Anderberg.
BY
Knight + Rodgers
ATTORNEYS.

United States Patent Office 2,721,354
Patented Oct. 25, 1955

2,721,354

CABLE ATTACHING STRUCTURE AND METHOD OF MAKING SAME

Axel W. Anderberg, Los Angeles, Calif.

Application May 7, 1951, Serial No. 225,030

15 Claims. (Cl. 16—202)

The present invention relates generally to a cable attaching structure and to a method of making the same; and more particularly to an attaching structure for fastening the flexible wire cable of a sash balance to a window sash.

Many different types of structures have been devised for attaching a cable to a window sash. Known types have generally been objectionable in that those of simple construction are not reliable because they fail to anchor the cable securely in the attaching structure. In overcoming this difficulty, the attachment means have usually been rendered complicated or expensive. The latter is particularly true when the connection between the cable and the clip of the attaching structure is accomplished by manual manipulation, as by tying the cable to the clip.

Hence it is a general object of my invention to provide means for connecting a flexible cable to a window sash or the like which is simple in design, easy to manufacture, and securely anchors the cable.

It is also an object of my invention to provide an attaching structure of this character which is especially adapted to manufacture by machine operations, thus reducing or eliminating comparatively expensive hand operations in the course of manufacture.

Another object is to provide a simple form of attachment clip for a cable attaching structure which is easily and securely anchored to the cable.

It is a further object of my invention to devise a method of manufacturing a cable attaching structure which employs a series of simple, easily performed steps in which power machinery may be utilized to the maximum extent.

A further object of the present invention is to devise a method of anchoring an attachment clip to a cable that is simple, reliable, and adapted to a power machine operation.

These and other objects of my invention have been accomplished by offsetting or depressing below one face thereof a central portion of a blank formed from sheet metal. In this central portion there is made a plurality of spaced slits that provide a row of spaced centrally located openings. The transverse strips of metal formed by and between successive slits are then displaced alternately in opposite directions up and down to form a clip to which the cable is connected by threading the cable through the passage way formed between the displaced strips so that successive strips are located at opposite sides of the cable. After this the strips are then flattened to return them substantially to a common plane with the result that the cable has an S-shaped bend formed in it as it passes through each of the openings between two of the strips.

Marginal portions of the blank are bent through 90° to form parallel flanges at two sides of the finished clip; and finally the clip is bent near its mid-point to approximately a right angle, preferably slightly less.

In the completed attaching structure, the attachment clip has an offset central area with a relatively raised bearing surface extending the full length of the clip along each of two sides of this offset central area. The cable is laced through a series of holes in said central area to pass alternately under and over successive strips with a relative sharp bend in the cable at the edge of each strip. The side flanges are of a depth slightly greater than the maximum overall dimensions of the cable to form means for holding the clip in place on the window sash as well as to protect the cable against wear.

How the above objects and advantages of my invention, as well as others not specifically mentioned, are attained will be more readily understood by reference to the following description and to the annexed drawings, in which:

Fig. 1 is a fragmentary elevation of a corner of a window sash showing the application thereto of my improved cable attaching structure;

Fig. 2 is an enlarged plan view of an attaching structure when partly formed and with the flexible cable in position for connection to the attachment clip;

Fig. 3 is a transverse section on line 3—3 of Fig. 2;

Fig. 4 is a longitudinal section on line 4—4 of Fig. 2;

Fig. 5 is a view similar to Fig. 2 showing the attachment clip while still straight and before bending to an angular position;

Fig. 6 is a longitudinal section on line 6—6 of Fig. 5;

Fig. 7 is a side elevation of the finished attaching structure after bending the clip to its normal angular position; and Fig. 8 is a fragmentary elevation of a corner of a window sash illustrating application thereto of a modified form of my invention.

It is believed that the construction and shape of the clip forming a part of my improved cable attaching structure will be most readily understood from a discussion of the method of making it and connecting it to a cable. Consequently, the structural features are described along with a description of the method of manufacture.

Manufacture commences with a flat blank of suitable size formed from sheet metal. As a matter of practice this blank may be the end section of a strip of metal and may not be separated from the remainder of the strip or an adjoining blank until an advanced stage in the manufacture of the complete article. The various steps of manufacture are not necessarily limited to the sequence in which they are described, although it will be apparent that in some instances a given step or operation must be done subsequently to certain other steps or operations.

Figs. 2, 3 and 4 show an attachment clip, indicated generally at 10, after several forming operations have been performed on the orignal metal blank. By a stamping operation a central portion at 11 is offset relative to the top face of the surrounding portion of the clip. As viewed in plan as in Fig. 3, the central portion 11 is depressed below the surrounding material. Area 11 is preferably rectangular in outline so that its two long sides are parallel to the long sides of the clip which is itself generally rectangular in outline. Extending transversely across offset area 11 is a plurality of slits 12 which are spaced apart, preferably at equal distances.

Slits 12 may take different shapes and are here shown as each comprising a simple cut with a centrally located circular opening 14. Thus the metal is cut at either side of each central opening 14 but is removed only at opening 14 to space apart the sides of slit 12 at this location. The size of the openings 14 is determined to some extent by the size of the cable connected to the clip as they should be somewhat larger than the cable. Instead of a central opening with a cut at either side, each slit may be rectangular in outline for its full length or it might have a diamond shape or the like. Any of these arrangements provide an opening at the center of the slit through which the cable can pass. The slit formed as shown in the drawings is preferred since it provides an adequate opening for the cable and at the same time retains maximum strength of the clip.

Between each two successive slits 12 there is formed a transverse strip 16 of material which is joined integrally at its ends wtih the remainder of the metal clip. Strips 16 are bent or displaced successively in opposite directions sufficiently to allow the cable to pass longitudinally between the strips. In Fig. 3 the first, third and fifth strips are depressed or bent downwardly while the second and fourth are raised or bent upwardly. The position of these strips after displacement in opposite directions is shown clearly in Figs. 3 and 4. It will be seen that these strips form a passage way extending longitudinally of the clip through which cable 15 can be threaded in a straight line as shown in Figs. 3 and 4, placing the cable in a position in which it passes at opposite sides of successive strips 16. Or, in other words, the successive strips are located at opposite sides of the cable.

At a suitable time in the series of forming operations, one or more holes 18 and 19 are punched near the ends of clip 10. These holes are for nails or screws by which the clip is attached to the window sash. It is preferable to provide at least nail hole 19; and optionally hole 18 may be added. Hole 18 is made larger in order that a nail going through it may pass to one side of cable 15.

Also at any suitable time, marginal portions of the metal blank at its two long sides are bent through approximately 90° to provide a pair of parallel flanges 20 which extend for the full length of the clip or substantially so. These two side flanges extend away from the top surface of the clip in the same direction that central area 11 is offset relative to this top surface.

After cable 15 has been threaded between strips 16 of the attachment clip into the position of Fig. 4, the displaced strips 16 are flattened until, viewed endwise, they at least partially overlap each other or preferably are returned substantially to a common plane. This is their position as shown in Fig. 6. The crimping operation produces an S-shaped bend in cable 15 each time it passes through an opening 14. These bends are preferably of relatively short radius so that the cable may be characterized as having a relatively sharp bend in it at the edge of each strip 16. Practically, there is a limit to the sharpness of this bend since the cable is stretched or flattened to some extent in the operation and if the bends are made too sharp the cable is weakened or sheared. On the other hand, creating a sharp bend at the edge of each strip produces a frictional engagement between the cable and the body of clip 10 which resists displacement of the cable as a result of a pull on it. By making several such bends in the cable, it is firmly anchored to the clip.

It is preferable to extend the central depressed area at both ends to the full length of clip 10, producing a clip as shown in Fig. 5. Here depressed areas 11a have been added at each end of the original area 11 so that the depressed central area now extends from end to end of the clip. This may conveniently be done in conjunction with flattening strips 16 to anchor the cable; but the operation may be performed earlier in the sequence. As seen in Fig. 6 especially, the relatively raised surface 22 at each side of the central depression provides a bearing surface over which the clip may bear against a window jamb while the central portion and cable 15 are comparatively recessed so that these elements do not bear against the jamb. This construction eliminates wear on the cable, reduces the total amount of friction involved, and prevents the head of a nail in either of openings 18 or 19 from snagging on any roughness on the jamb.

At the same time, if not done earlier in the sequence of operations, the terminal portion 22a of each raised area 22 is preferably bent downwardly slightly as shown in Figs. 5 and 6. In this form of my invention these terminal portions are at one end only of bearing areas 22, although as mentioned later they may be formed at both ends. As the areas 22 slide against the window jamb, the bent terminal portions act in the same way as the curved front end of sled runners to promote a smooth sliding action. The end of the clip is notched at 23 between portions 22a because the offset area 11a resists making a bend entirely across the clip; and for the same reason side flanges stop short of tips 22a.

As a final step, the straight clip of Figs. 5 and 6 is bent near its mid-point to an angular configuration as shown in Fig. 7 in which the two legs of the clip extend substantially at right angles to each other. Actually, it is preferable that the angle be slightly less than a right angle, say in the vicinity of 85°, for reasons which will be explained.

The completed structure is attached to a window sash 25 as shown in Fig. 1 by placing the angularly shaped clip 10 at a lower corner of the sash. The clip being bent to an angle slightly less than a right angle, it does not initially conform exactly to the outline of the window; but by tapping the clip at the bend with a hammer while in place on the sash, the two legs of the angle spread apart slightly until they conform to the sides of the sash. At the same time, side flanges 20 are thereby both imbedded slightly in the wood, as indicated by the dotted lines in Fig. 1. This assists in holding the attachment clip on the sash without twisting or turning. The attachment means is secured in place by driving nail 26 through hole 19 into the sash. Another nail may be driven through hole 18 if desired.

As may be seen from Fig. 1, the relatively raised bearing surfaces 22 engage jamb 27 of the window casing and act as runners that ride over the surface of the jamb. The attachment means spaces the window sash away from the jamb a sufficient distance that cable 15 can extend upwardly between the sash and the window jamb without rubbing against either one and is therefore protected against abrasion and wear which would occur if the cable were continually sliding over the jamb.

A modified form of my invention is shown in Fig. 8 which is essentially the same as the attaching structure already described except that clip 10a is straight throughout its entire length since the final method step of bending the clip to substantially a right angle has been omitted. Also, both ends of the metal clip are formed in the same way as shown at the left hand end of clip 10 in Figs. 5 and 6. In addition to terminal sections 22a of the bearing surfaces 22 at one end of the clip, the other end of the clip has terminal sections 22b which are similar in shape and configuration to tabs 22a previously described.

The variational form of cable attaching structure 10a is fastened to a window sash 25 by a nail 26 passing through hole 19 in a manner similar to that already described. Being straight, the entire clip is located at the side of the sash between the sash and the window jamb 27, rather than having a portion of the clip underneath the lower edge of the window as in Fig. 1. The clip is tapped with a hammer to imbed flanges 20 partially in the wood of the window sash, as indicated by the dotted lines in Fig. 8, in order to assist in holding the clip in its proper position. Since the attaching clip is in contact with the window jamb throughout its entire length, it is preferable to have bent over portions at both ends of bearing surfaces 22a, as by the provision of the tabs 22b in addition to tabs 22a. The second set of tabs was not required in the angular form of the attaching structure since the same function was performed by the bend at the middle of the clip.

It will be noted that in both forms of the invention cable 15 where it passes over strips 16 is spaced from the window jamb so that no wear occurs on the cable in these locations. This is a result of the offsetting of the central area 11 relative to longitudinal bearing surfaces 22. Likewise, the head of nail 26 is spaced from the window jamb and does not scrape against it since the central depressed portion 11 has been extended at the ends by also depressing areas 11a.

Having described a preferred embodiment of my invention and certain modifications thereof, it will become apparent that other changes in my invention may be made by persons skilled in the art without departing from the spirit and scope of my invention. Consequently, the foregoing description is considered as being illustrative of, rather than limitative upon, the appended claims.

I claim:

1. Cable attaching structure comprising: a clip of sheet metal connected to a flexible cable, the clip having an offset central portion leaving at each side thereof a bearing surface raised above the central portion and extending the full length of the clip; and a plurality of spaced transverse slits in the offset portion forming a series of integral strips positioned alternately under and over the cable, the cable having a sharp bend at the edge of each strip.

2. Cable attaching structure as in claim 1 in which the clip has two parallel flanges, one along each side, extending away from said bearing surfaces in the direction of offset of said offset portion, to extend beyond the cable at the offset portion.

3. Cable attaching structure as in claim 2 in which a terminal portion of each raised bearing surface at one end of the clip is bent in the direction of offset of the offset portion.

4. Cable attaching structure as in claim 2 in which the clip is straight and the raised bearing surfaces are planar with an inwardly bent terminal portion at each end of both bearing surfaces.

5. Cable attaching structure as in claim 2 in which the depth of offset of the central portion is sufficient to position all the integral strips substantially mid-way of the parallel flanges.

6. Cable attaching structure comprising: a clip of sheet metal connected to the terminal portion of a flexible cable, the clip having a depressed central portion provided with a plurality of spaced openings arranged in a straight row; and the cable passing through successive ones of said openings in opposite directions with an S-shaped bend at each opening to engage the clip frictionally.

7. Cable attaching structure comprising: an elongated clip of sheet metal connected to a flexible cable, the clip having a plurality of transversely extending slits forming transversely extending strips spaced apart centrally of the clip and joined integrally at their ends with the remainder of the clip, and the strips lying substantially in a common plane; and the terminal portion of the flexible cable passing through the slits and alternately under and over the strips.

8. The method of forming a cable attaching structure that includes the steps of forming in a flat metal blank a plurality of adjoining parallel strips joined integrally at their ends to the blank; displacing successive strips in opposite directions; threading a cable between all the displaced strips; and returning the strips to substantially their original positions to grip the cable.

9. The method of forming a cable attaching structure as in claim 8 that also includes the step of offsetting the blank at each end of the strips to form parallel bearing surfaces raised beyond the cable where it passes over the strips.

10. The method of forming a cable attaching structure as in claim 9 that also includes the step of forming two parallel flanges, one at each side of the blank, the flanges extending beyond the cable where it passes under the strips.

11. A metal clip for use in a cable attaching structure comprising: an elongated body of sheet metal having in its central portion a plurality of transversely extending strips joined integrally to the body at their ends, successive strips being bent in opposite directions and the central portion of the body being offset with respect to a marginal portion at each side of the central portion to provide two longitudinally extending bearing surfaces raised above the central portion.

12. A metal clip as in claim 11 which has marginal portions bent at substantially 90° to the main body to form two parallel, longitudinally extending flanges.

13. Cable attaching structure comprising: a clip of sheet metal having an offset central portion leaving at each side thereof a bearing surface raised above the central portion, said clip having a plurality of spaced transversely extending slits located in the offset portion forming a series of integral metal strips; and a flexible cable having a terminal portion passing through successive slits in opposite directions with a sharp bend at the edge of each strip.

14. A metal clip for use in a cable attaching structure comprising: an elongated body of sheet metal having in its central portion a plurality of parallel, transverse slits forming a plurality of contiguous, transversely extending strips each joined integrally at both ends to the body, successive strips being bent away in opposite directions from the plane of the central portion of the body and each strip being spaced longitudinally from adjoining strips at a position near its center, all so constructed and arranged as to permit a cable to pass between successive strips when they are returned substantially to the plane of the central portion of the body.

15. A method of forming a cable attaching structure that includes the steps of cutting in a metal blank a plurality of transversely extending parallel slits to form a series of transversely extending metal strips which remain integrally connected at their ends; displacing the strips alternately in opposite directions; threading the end of a cable between successive strips starting at one end of the series of strips; and returing the strips to substantially their original positions to engage the cable firmly.

References Cited in the file of this patent

UNITED STATES PATENTS

| | | |
|---|---|---|
| 363,352 | Avery | May 24, 1887 |
| 816,283 | Weinman | Mar. 27, 1906 |
| 817,039 | Broome | Apr. 3, 1906 |
| 858,555 | Altick | July 2, 1907 |
| 1,368,480 | Brown | Feb. 15, 1921 |
| 1,453,082 | Rosenberg | Apr. 24, 1923 |
| 1,460,145 | Seiss | June 26, 1923 |
| 1,494,672 | Dowling et al. | May 20, 1924 |
| 1,706,854 | Kroczek | Mar. 26, 1929 |
| 1,944,251 | Masberndel | Jan. 23, 1934 |
| 2,131,766 | Temple | Oct. 4, 1938 |
| 2,230,663 | Alden | Feb. 4, 1941 |
| 2,345,890 | Daniels et al. | Apr. 4, 1944 |
| 2,360,793 | Rachlin | Oct. 17, 1944 |
| 2,438,101 | Wright | Mar. 16, 1948 |
| 2,466,083 | Crosby | Apr. 5, 1949 |